United States Patent [19]
Khanarian et al.

[11] Patent Number: 5,224,196
[45] Date of Patent: Jun. 29, 1993

[54] WAVEGUIDE DEVICE AND METHOD FOR PHASE MATCHED SECOND HARMONIC GENERATION

[75] Inventors: Garo Khanarian, Berkeley Heights, N.J.; Robert Norwood, Tokyo, Japan; James Sounik, Corpus Christi, Tex.; Jacquelyn Popolo, Flemington, N.J.; Steve Meyer, Tobyhanna, Pa.

[73] Assignee: Hoechst Celanese Corp., Somerville

[21] Appl. No.: 896,253

[22] Filed: Jun. 10, 1992

Related U.S. Application Data

[63] Continuation-in-part of Ser. No. 744,564, Aug. 13, 1991, abandoned.

[51] Int. Cl.$^5$ .............. G02F 1/37; H03F 7/00; F21V 9/00
[52] U.S. Cl. .................. 385/122; 385/130; 385/141; 359/326; 359/328; 359/332; 252/582; 252/583
[58] Field of Search ......... 385/122, 129, 130, 131, 385/141, 143, 145, 39, 40; 359/326, 327, 328, 329, 330, 331, 332; 252/582, 583, 587, 588, 589

[56] References Cited

U.S. PATENT DOCUMENTS

| | | | |
|---|---|---|---|
| 4,838,638 | 6/1989 | Kamiyama et al. | 385/122 X |
| 4,865,406 | 9/1989 | Khanarian et al. | 385/122 X |
| 4,877,298 | 10/1989 | Teng et al. | 385/141 X |
| 4,886,339 | 12/1989 | Scozzafava et al. | 385/141 X |
| 4,952,013 | 8/1990 | Harada et al. | 385/122 X |
| 4,971,416 | 11/1990 | Khanarian et al. | 385/122 X |
| 5,131,068 | 7/1992 | Khanarian et al. | 385/141 |
| 5,157,754 | 10/1992 | Bierlein et al. | 385/122 |
| 5,158,823 | 10/1992 | Enomoto et al. | 385/122 X |
| 5,168,388 | 12/1992 | Tamada et al. | 359/328 |
| 5,170,460 | 12/1992 | Arvidsson et al. | 385/129 |
| 5,170,461 | 12/1992 | Yoon et al. | 385/130 |
| 5,175,784 | 12/1992 | Enomoto et al. | 385/122 |

OTHER PUBLICATIONS

G. L. J. A. Rikken et al., Phillips J. Research, vol. 46, Nos. 4-5, pp. 215-230 (1992).

*Primary Examiner*—Brian Healy
*Attorney, Agent, or Firm*—Palaiyur S. Kalyanaraman

[57] ABSTRACT

In one embodiment this invention provides a frequency doubling optical waveguide consisting of a substrate-supported polymeric thin film waveguiding layer, in combination with one or more polymeric cladding layers. The waveguiding layer comprises moieties which exhibit nonlinear optical properties as well as anomalous dispersion of refractive index such that, under wave propagating conditions, the effective dispersion $\Delta N$ of the waveguiding layer is zero, and the fundamental and second harmonic waves are phase matched over the length of the waveguide.

32 Claims, 3 Drawing Sheets

WAVEGUIDE DEVICE AND METHOD FOR PHASE MATCHED SECOND HARMONIC GENERATION

This is a continuation-in-part of copending application(s) Ser. No. 07/744,564 filed on Aug. 13, 1991, now abandoned.

This invention relates to waveguide devices containing guiding layers that provide anomalous dispersion of refractive index during frequency doubling. Such devices have utility in processes such as, for example, frequency doubled second harmonic generation, especially for short wavelength lasers.

BACKGROUND OF THE INVENTION

There is an increasing interest in the development of a compact diode laser source in the 400-500 nm range for advanced applications such as optical disk technology, laser scanning, laser printing, and medical protocols.

There are several possible approaches to a prospective short wavelength, diode laser source. The traditional diode materials such as the ternary and quaternary compounds of In, Ga, As, Al, P, and Sb do not have a direct energy gap high enough to produce a short wavelength laser. A number of other laser materials have been studied for development of diode laser sources in the blue wavelength region. These materials include II-VI semiconductors, quantum well materials, and other wide band gap semiconductors such as cadmium sulfide (CdS). Although the blue quantum well structure shortens the lasing wavelength, it requires a cryogenic condition for lasing. There also has been investigation of II-VI wide-gap superlattices with the goal of achieving diode emission in the blue-green region of the spectrum, but these materials have only produced optically pumped lasers requiring cooling at liquid nitrogen temperature. Other semiconductors that are known to lase in the 450-500 nm range are CdS, ZnSe, ZnCdS, and CdSeS. Lasers of these materials require either optical or electron beam pumping for their operation.

In view of the impracticality of a direct diode laser source, attractive alternatives involve frequency conversion of available diode laser sources, either by frequency doubling or parametric upconversion. The traditional frequency conversion techniques utilize phase matching of input beams and harmonic waves in second order optical crystals such as potassium dihydrogen phosphate (KDP and KD*P), LiNbO$_3$ and LiIO$_3$. However, because of the relatively low values of second order susceptibility of these crystals, and the low beam intensity of a diode laser, a long single crystal usually is required to achieve appreciable power conversion to the second harmonic tensor.

In general, classical phase matching (e.g., via angle or thermal tuning) requires a certain combination of intrinsic birefringence and dispersion of refractive indices. New small molecular weight crystalline organic nonlinear optical materials with high second harmonic susceptibility have been reported in literature such as ACS Symposium Series No. 233, pages 1-26, 1983 by A. Garito et al. These organic materials usually possess high intrinsic birefringence and positive dispersion so that phase matching can be achieved with a single crystal.

As alternative means to achieve phase matched conditions is the sue of dispersion properties for different modes in a waveguide. Since the energy is confined laterally to a narrowly constricted space, a high light intensity is possible with a relatively low power source. In this approach, one usually excites a lower order mode of the fundamental beam and the second harmonic generated propagates in a higher order mode. If the waveguide geometry and refractive indices of the guiding region and cladding region are such that:

$$\Delta\beta = \beta_n(\omega_3) - \beta_m(\omega_2) - \beta_1(\omega_1) = 0$$

then the phase matching condition is established. Here, $\beta_i$ is the propagation constant of the i-th mode. The conversion efficiency is generally quadratically dependent on the overlap integral between the two modes:

$$\int E_n(\omega_3, z) E_m(\omega_2, z) E_1(\omega_1, z) dz$$

where E is the normalized electric field of the mode across the waveguide. In general, the overlap between the waveguide modes is limited, and the value of the overlap integral is also small. This approach has been utilized for phase matching in waveguides derived from organic materials, as reported in *Optics Commun.*, 47, 347 (1983) by Hewig et al.

Of background interest with respect to the present invention is literature relating to spatially periodic nonlinear structures for modulation of electromagnetic energy. The pertinent literature includes *IEEE J. of Quantum Elect.*, OE-9 (No. 1), 9 (1973) by Tang et al; *Appl. Phys. Lett.*, 26, 375 (1975) by Levine et al; *Appl. Phys. Lett.*, 37(7), 607 (1980) by Feng et al; and U.S. Pat. Nos. 3,384,433; 3,407,309; 3,688,124; 3,842,289; 3,935,472; 4,054,362; and 4,865,406.

The thin film waveguides with a periodically modulated nonlinear optical coefficient as described in the literature are from either inorganic optical materials, or from organic materials which are in the liquid phase, such as a liquid crystal medium or a thin film of nitrobenzene which require a continuously applied external DC electric field.

Of particular interest with respect to the present invention is literature relating to the dispersive properties of a thin film optical waveguide for TE and TM modes, as expressed in analytic terms defining the variation of the effective refractive index with respect to one or more physical parameters in the waveguiding medium. The pertinent literature includes *J. Appl. Phys.*, 49(9), 4945 (1978) by Uesugi et al; *Appl. Phys. Lett.*, 36(3), 178 (1980) by Uesugi; *Nonlinear Optics; Proceedings of The International School of Materials Science and Technology*, Erice, Sicily, Jul. 1-14, 1985 (Springer-Verlag), pages 31-65 by Stegeman et al; *Integrated Optics*, volume 48, pages 146-151 by Ostrowsky (Springer-Verlag, 1985); *Integrated Optics*, Volume 48, pages 196-201 by Bava et al (Springer-Verlag, 1985); and *Appl. Opt.*, 25(12) 1977 (1986) by Hewak et al, Cahill et al, *Opt. Letters*, 14, 1137 (1989) describe anomalous dispersion associated with strong absorption in asymmetric dyes which permits phase matched second harmonic generation at a given frequency and concentration. Seppen et al, *Appl. Phys. B*, Vol 53, 282 (1991) describe measurements of the linear optical properties of methacrylate copolymers containing nonlinear optical (NLO) side chains.

Several of the earlier known materials for waveguiding layers have high absorption at around the transparent window, which is the region of frequency useful for device fabrication. Thus, there is a need for materials with broader transparent window. There is also a continuing interest in the development of inorganic and organic short wavelength laser modules which can be fabricated to operate efficiently as frequency doubling devices.

Accordingly, it is an object of this invention to provide a short wavelength laser source by the frequency doubling of an input laser beam.

It is another object of this invention to provide a short wavelength laser source by efficient frequency conversion of an input long wavelength laser beam in an organic nonlinear optical waveguide.

It is a further object of this invention to provide a process for converting a 700–1300 nm laser beam into an output 350–650 nm laser source, whereby the effective dispersive properties of a laminated composite of polymeric waveguiding and cladding thin films are utilized to achieve phase matching of fundamental and second harmonic wave modes.

It is a yet another objective of this invention to provide novel organic materials useful as guiding and cladding layers in such frequency conversion devices.

Other objects and advantages of the present invention shall become apparent from the accompanying description and drawings.

BRIEF SUMMARY OF THE DRAWINGS

The invention is described in detail below with reference to the figures (FIGS. 1(a), 1(b), 2, 3, and 4.)

DESCRIPTION OF THE INVENTION

Figure 1A:
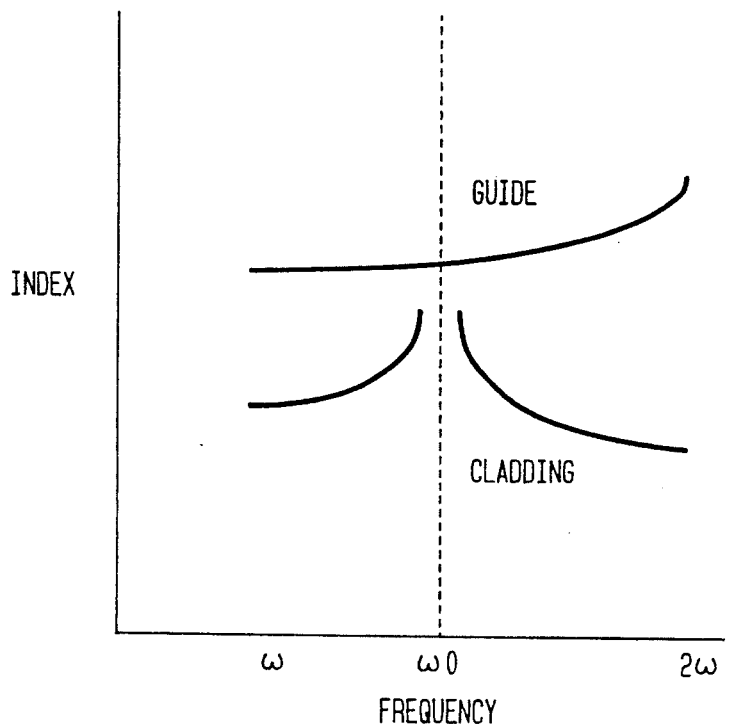
FIG. 1(a) and FIG. 1(b) are graphic representations of two cases of dispersive combinations in the inventive waveguides.
Figure 1B:
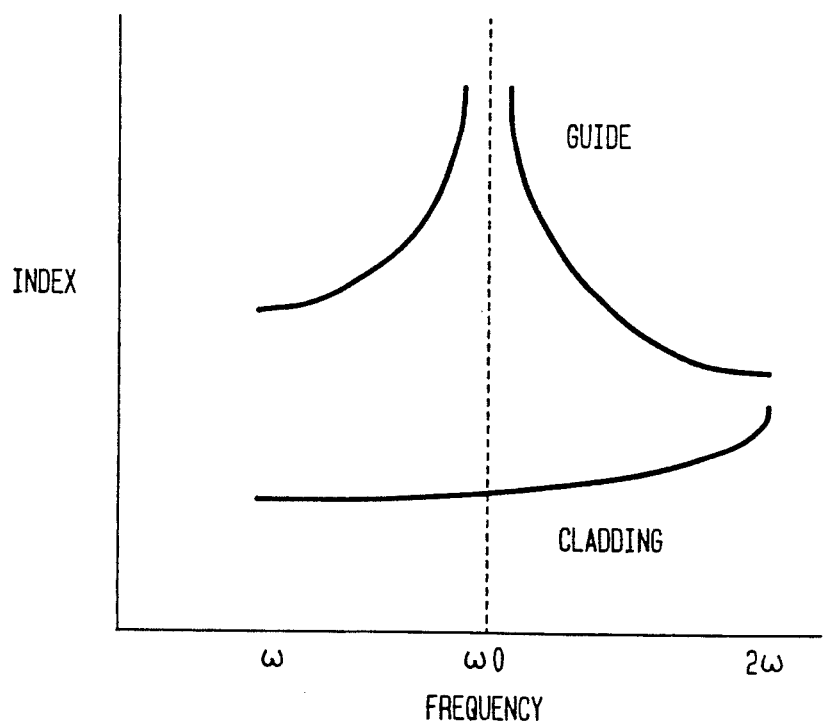

One or more objects of the present invention are accomplished by the provision of a waveguide device for frequency doubling of a laser beam which comprises a laminated thin film composite of (1) a waveguiding layer which exhibits second order nonlinear optical response, and (2) one or more cladding layers which have a lower refractive index than the waveguiding layer; wherein the waveguiding layer and the cladding layers have a combination of positive and negative dispersion. There are two possibilities of such a combination: in the first, the waveguiding layer has a positive dispersion while the cladding layer has a negative dispersion, and the second one has vice versa of the first. The result is that under wave propagating conditions the refractive index of a fundamental light frequency is about equal to the refractive index of a second harmonic light frequency in the waveguiding layer, and the fundamental and second harmonic wave modes are phase matched. This is illustrated in FIGS. 1(a) and 1(b). The terms 'waveguiding layer' and 'waveguiding medium' are being used synonymously in this Specification.

In another embodiment, this invention provides a waveguide device for frequency doubling wherein the guiding layer has substantially zero dispersion and the cladding layer has negative dispersion, such that the refractive index of the fundamental wavelength is equal to that of the second harmonic light in the waveguide. Such a zero dispersive guide layer may be achieved, for example, by having in the guide a mixture of suitable components which compensate the dispersive properties of one another such that the net dispersion in the guide is substantially zero. The mixture may comprise organic or inorganic or a combination of organic and inorganic components.

Figure 2:
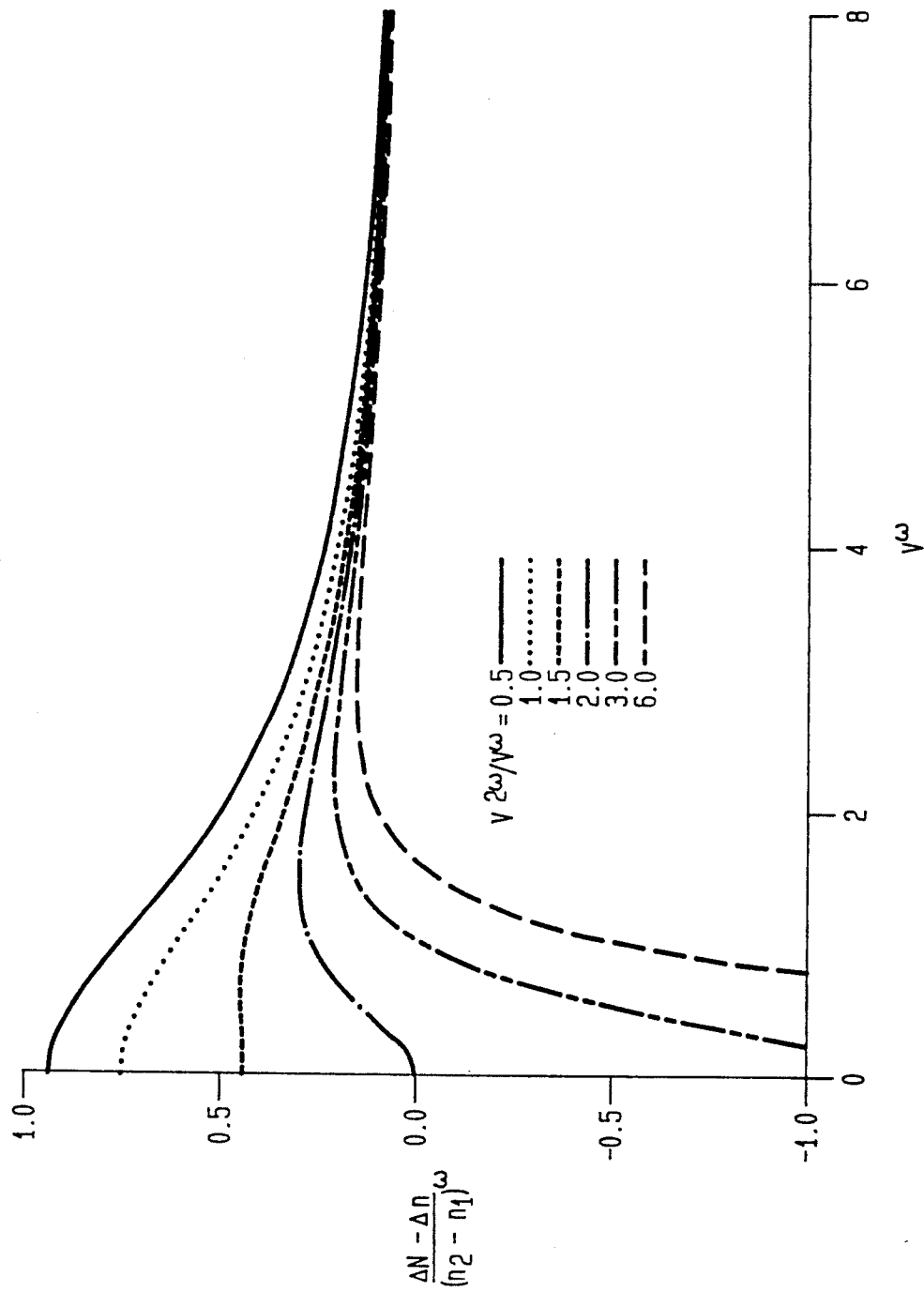
FIG. 2 is a plot of the generalized dispersion parameter versus the frequency parameter.

In yet another embodiment this invention provides a waveguide device for frequency doubling of a laser beam with phase matched zero order propagating modes utilizing the nonlinear optical $d_{33}$-tensor, which comprises a laminated thin film composite of (1) an organic waveguiding layer which exhibits second order nonlinear optical response, and (2) organic cladding layers which have a lower refractive index than the waveguiding layer; wherein the generalized optical dispersion of the waveguide $$D = \frac{\Delta N - \Delta n_2}{n_2^\omega - n_1^\omega}$$

is a function of normalized frequency parameter $V^\omega$ for different ratios of $V^{2\omega}/V^\omega$, and $\Delta N = N^{2\omega} - N^\omega$ is the optical dispersion of the effective refractive indices of the zero order fundamental and harmonic wave modes. $\Delta n_2 = n_2^{2\omega} - n_2^\omega$ is the optical dispersion of the waveguiding layer, $n_2^\omega - n_1^\omega$ is the refractive index difference between the waveguiding layer and a cladding layer at the fundamental wave frequency, and $$V^\omega = \frac{2\pi t}{\lambda} \sqrt{(n_2^\omega)^2 - (n_1^\omega)^2} \text{, and}$$

$$V^{2\omega} = \frac{4\pi t}{\lambda} \sqrt{(n_2^{2\omega})^2 - (n_1^{2\omega})^2}$$

where $V^\omega$ and $V^{2\omega}$ are the generalized fundamental and second harmonic wave frequency parameters, t is the thickness of the waveguiding layer, and $\lambda$ is the fundamental wavelength; and wherein $\Delta N$ approximates zero under phase matching conditions. FIG. 2 illustrates the relationship D versus $V^\omega$ for various values of $V^{2\omega}/V^\omega$.

In a further embodiment this invention provides a process for providing a short wavelength laser source which comprises (1) introducing a 700–1300 nm laser beam into an optical waveguide device comprising a substrate-supported laminated thin film composite of the above embodiment, and (2) doubling the frequency of the propagating fundamental wave to provide an output 350–650 nm laser beam.

A preferred type of inventive waveguide is one consisting of a laminated thin film composite of an organic waveguiding layer in coextensive contact with upper and lower organic cladding layers. An essential feature of a present inventive waveguide is a uniform waveguiding layer, and the average refractive indexes at the fundamental and harmonic wave frequencies are about equal.

The phase matching in an inventive waveguide is accomplished between zero order propagating modes of the fundamental and second harmonic waves of the same polarization, resulting in a large overlap of optical waves. The phase matching utilizes the largest $d_{33}$ nonlinear optical coefficient, and occurs over the full length of the waveguide. A present inventive waveguide is uniform rather than periodic in optical configuration, and can be homogeneous in composition since it does not depend on birefringence to accomplish phase matching.

The negative dispersive value in either layer is achieved by including an anomalous dispersive material in that layer during fabrication. Preferably the layer is a polymeric thin film, and the dispersive chromophore is contained either in the polymer molecular structure as a covalently linked moiety, or in a separate compound as a guest component of the layer. If the chromophore is in a polymer structure, the polymer is preferably a side chain polymer. If it is a guest-host system, typically the chromophore is present in a quantity between about 0.5–15 weight percent, when incorporated as a guest in a host polymer thin film. The dispersion of the guiding layer compensates for the dispersion of the cladding layers; the net dispersion is zero or nearly zero.

In one embodiment, the present inventive guiding layer comprises an organic nonlinear optical side chain polymer whose repeating units are shown in Formula 1:

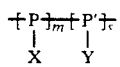

in 1, P and P' could be the same or different and represent the monomer moieties forming the polymer backbone, m and s are integers which total at least 10, with the m monomer comprising between about 10–100 mole percent of the total (m+s) monomer units; X and Y are covalently linked discrete parts of the polymer. X is a nonlinear optical moiety capable of frequency doubling of the input light, and Y is a moiety capable of anomalous dispersion of the refractive index at about said frequency doubling region, wherein the fundamental and harmonic frequencies are phase matched. P and P' represent vinyl monomer moieties, such as acrylates, styrenic moieties, and the like. In addition to P and P', the polymer may contain other monomeric moieties. For example, addition of a third vinylic moiety so as to make the composition a terpolymer may have beneficial effects on physical properties such as molecular weight, $T_g$, film formation and the like. If additional monomers are incorporated, then the m monomer and the s monomer are present in sufficient amounts to give rise to the desired second harmonic and dispersive effects.

As afore-mentioned, X is a moiety that is capable of second harmonic generation. Such moieties typically contain an electron donor group and an electron acceptor group linked by a conjugated electron system. Examples of Y include azaannulenes such as, for example, phthalocyanine, naphthalocyanine, anthrcyanine, and the like. In addition, X and y may optionally contain one or more spacer groups to link the nonlinear optical moiety covalently to the polymer. While X generates the second harmonic frequency, Y lowers the refractive index at the harmonic frequency to near about the level of the refractive index at the fundamental frequency by anomalous dispersion, thus making the process potentially phase matching. X and Y are chosen so as to preserve the film forming characteristics of the composition thus facilitating device fabrication.

The X moiety, as described above, contains electron donor groups and electron acceptors groups linked via a conjugated unit. Some electron donor groups useful in the invention

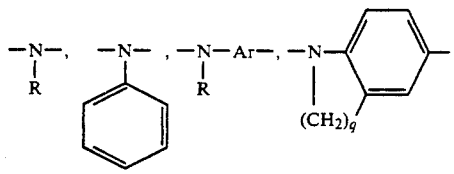

—O—, or —S—, R being hydrogen or a C1–C4 alkyl, q is 2–3, and Ar is

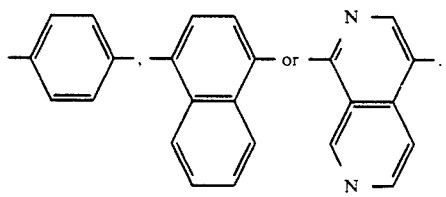

Useful electron acceptor groups are, for example, C(CN)2, C(H) (CN), C(H) (NO2), C(H) (CF3), C(H) (SO2CH3), or C(H) (SO2CF3). Useful spacer groups are, for example, $(CHR)_n$ and $(SiR^1{}_2)_p$ functionalities, where R is hydrogen or a C1–C6 alkyl, $R^1$ is a C1–C6 alkyl, n is an integer from 1 to about 12, and p is an integer from about 1–6. Some typical nonlinear optical moieties along with some typical spacer groups are shown in Formulas 2, 3, and 4 below:

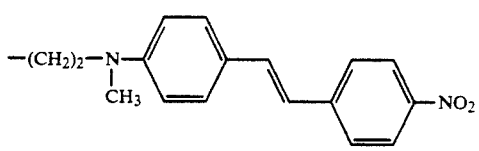

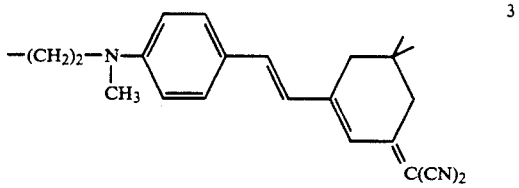

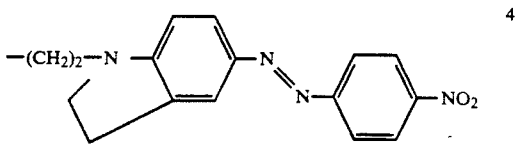

An embodiment waveguiding layer material of the present invention is described below as an acrylic polymer containing both a nonlinear functionality and an azaannulene moiety as covalently linked parts. The polymer is shown in Formula 5:

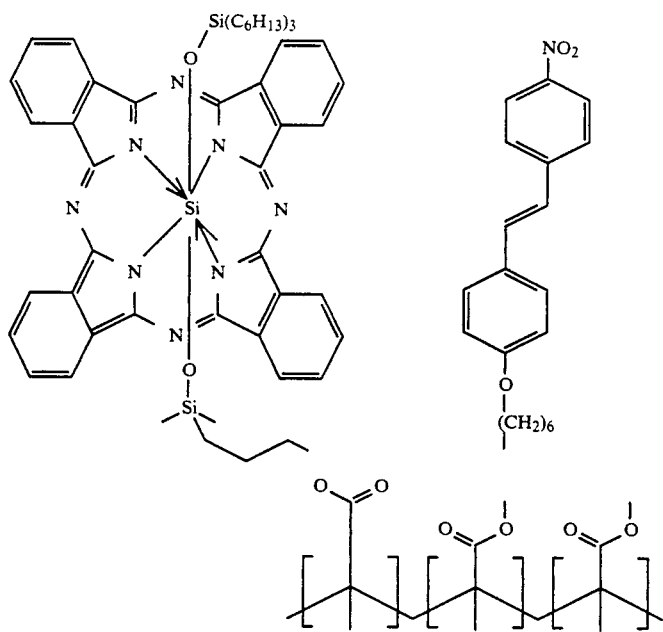

30

The above polymer, which is a terpolymer of methyl methacrylate (Formula 6), an acrylate of a silicon phthalocyanine (Formula 7), and 4-(N-methacryloxyethyl-N-methyl)amino-4'-nitrostilbene (Formula 8) may be synthesized by various methods. Free radical polymerization from the respective monomers is a convenient method. Thus, the monomers of Formulas 6, 7, and 8 may be dissolved in the desired ratio in a solvent such as for example, chlorobenzene, a free radical initiator such as for example, azobisisobutyronitrile (AIBN) may be added, and polymerization performed under typical free radical polymerization conditions, to yield the polymer of Formula 5. Free radical polymerizations are discussed in *Textbook of Polymer Science*, ed. by F. Billmeyer, Jr., 3rd ed., John Wiley & Sons, 1984. Methyl methacrylate is commercially available. The synthesis of the monomer of Formula 8 is described in U.S. Pat. No. 4,822,865.

The monomer of Formula 7 was synthesized as in Scheme 1.

Scheme 1

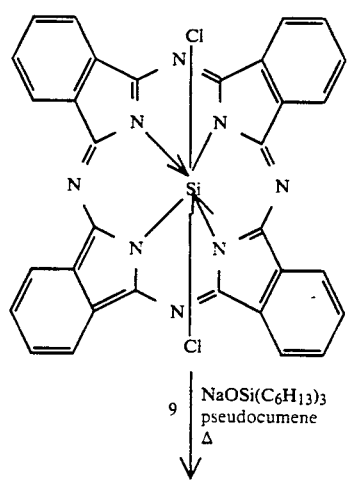

-continued
Scheme 1

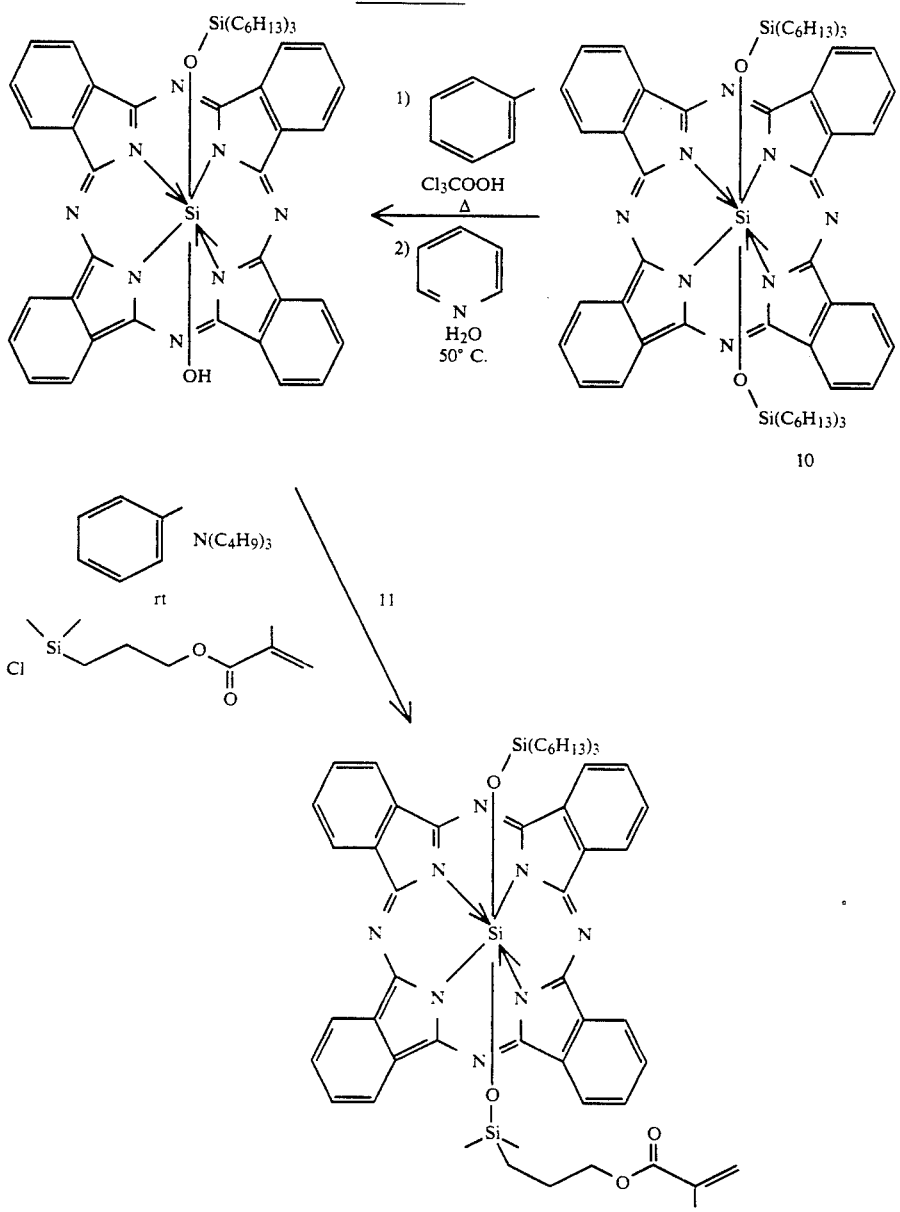

Thus, dichlorosilicon phthalocyanine (Formula 9) is reacted with sodium tri-n-hexylsiloxide to produce bis(-tri-n-hexylsiloxy)silicon phthalocyanine (Formula 10). This can be partially hydrolyzed using an acid such as trichloroacetic acid in a solvent such as toluene to produce hydroxy (tri-n-hexylsiloxy)silicon phthalocyanine (Formula 11), which can then be reacted with 3-methacryloxypropyldimethylchlorosilane to yield the compound of Formula 7.

Alternatively, X may be a naphthalocyanine moiety instead of a phthalocyanine. For example, X may be a dimethacrylate of a silicon naphthalocyanine of Formula 12. Compound of Formula 12 is prepared by reacting dihydroxysilicon naphthalocyanine with 3-methacryloxypropyldimethylchlorosilane in the presence of a base such as, for example, pyridine. Synthesis of dihydroxysilicon naphthalocyanine is described in the Ph.D. Thesis of Lee Schechtman, *Case Western Reserve Univ.*, 1983. Naphthalocyanine of Formula 12 may then be copolymerized with monomers of Formulas 6 and 8 as described above to form the terpolymer of Formula 13 which may then be used as the waveguiding layer material.

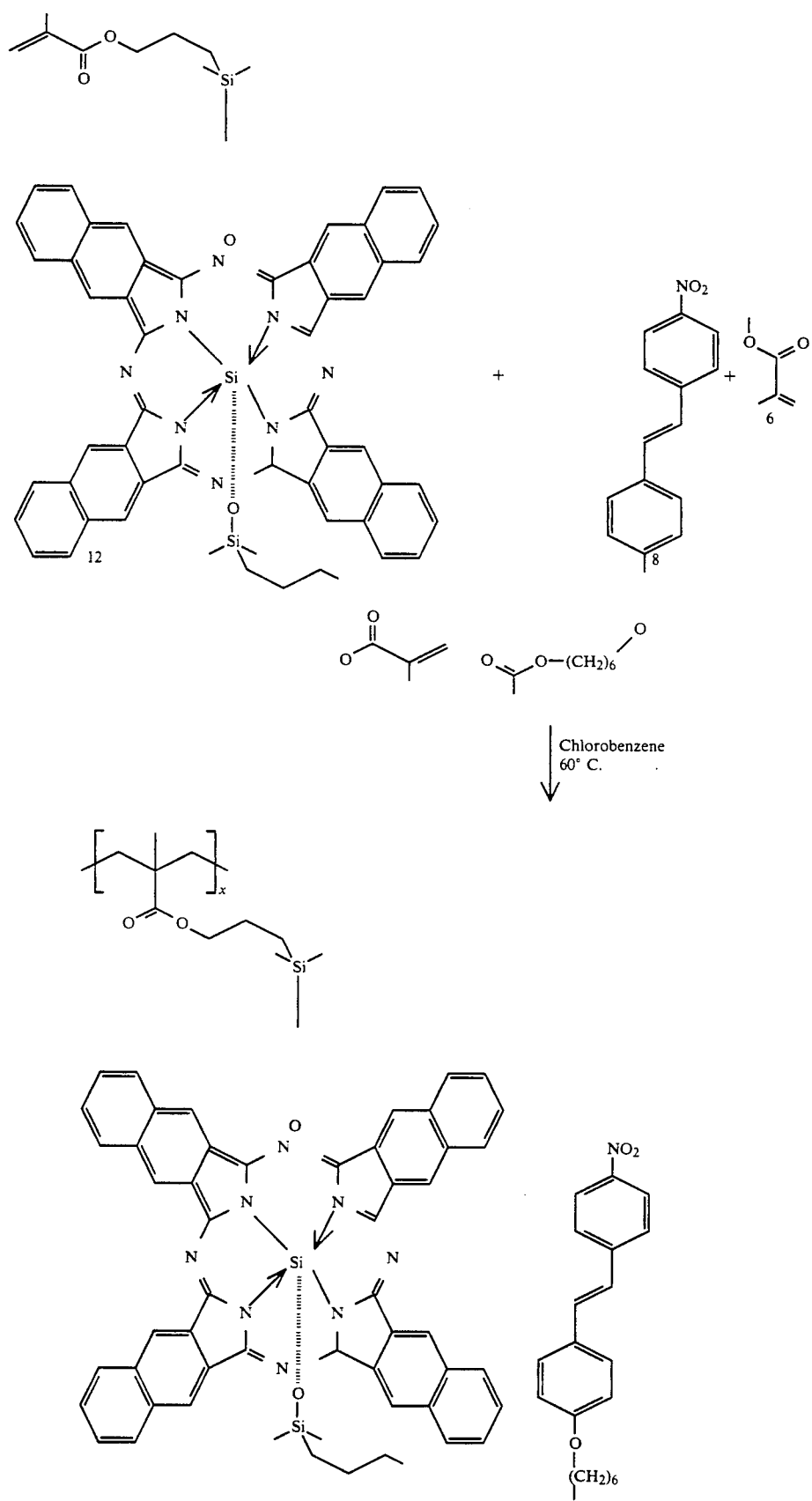

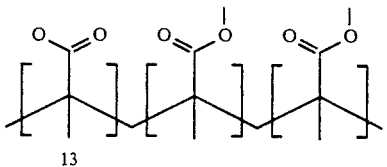

13

In another embodiment of the invention, the guiding layer may comprise a guest host mixture to generate phase matched harmonic frequencies by frequency conversion with anomalous dispersion of index. A nonlinear optical polymer may be the host and an azaannulene may be the guest molecule, or nonlinear optical chromophores may be the guest molecules, while an azaannulene polymer may be the host. Useful nonlinear optical polymers are described, for example, in U.S. Pat. No. 4,865,430 described above. Several azaannulenes such as phthalocyanines, and naphthalocyanines are commercially available. Azaannulenes with specific substitutions, if desired, may be synthesized by well known techniques in the art. Synthesis of several silicon naphthalocyanines are described, for example, in U.S. Pat. No. 4,725,525, as well as in the above-mentioned Ph.D. Thesis of Less Schechtman.

Another embodiment guiding layer of the invention discloses a film forming non-polymeric azaannulene composition which is substituted in such a manner as to give rise to nonlinear optical properties in the composition. For example, a film forming phthalocyanine or naphthalocyanine with silicon as the central metal atom may be substituted, either on the aromatic rings or via the central silicon, with substituents that have electron donor and electron acceptor properties in such a way that the substituents may cause second harmonic generation of a laser source, while the phthalocyanine or naphthalocyanine may cause anomalous dispersive effect of refractive index. An example would be the naphthalocyanine of Formula 14;

coating, and the like. Generally, spin coating is preferred due to its simplicity and speed. For a typical spin coating experiment, a solution of the material, for example polymer of Formula 13 is made in a suitable solvent such as, for example, cyclohexanone. The solution is typically filtered through microporous membranes made of polytetrafluoroethylene (Teflon ®, from E. I. duPont de Nemours & Co., Wilmington, Del.) to remove any insolubles. The filtered solution can be spin coated onto suitable substrates such as, for example, silicon, glass, aluminum, plastics, and the like, at spin speeds ranging from about 200-5,000 revolutions per minute (rpm) for periods ranging from about 20-200 seconds. Drying of the coatings leaves films with good transparency, with thickness between about 0.1-10 microns.

The term "transparent" as employed herein refers to an optical medium which is transparent or light transmitting with respect to both fundamental and harmonic frequencies, and which does not have crystalline regions with a preferred short range molecular order and a higher density that can act as optically scattering centers.

Figure 3:
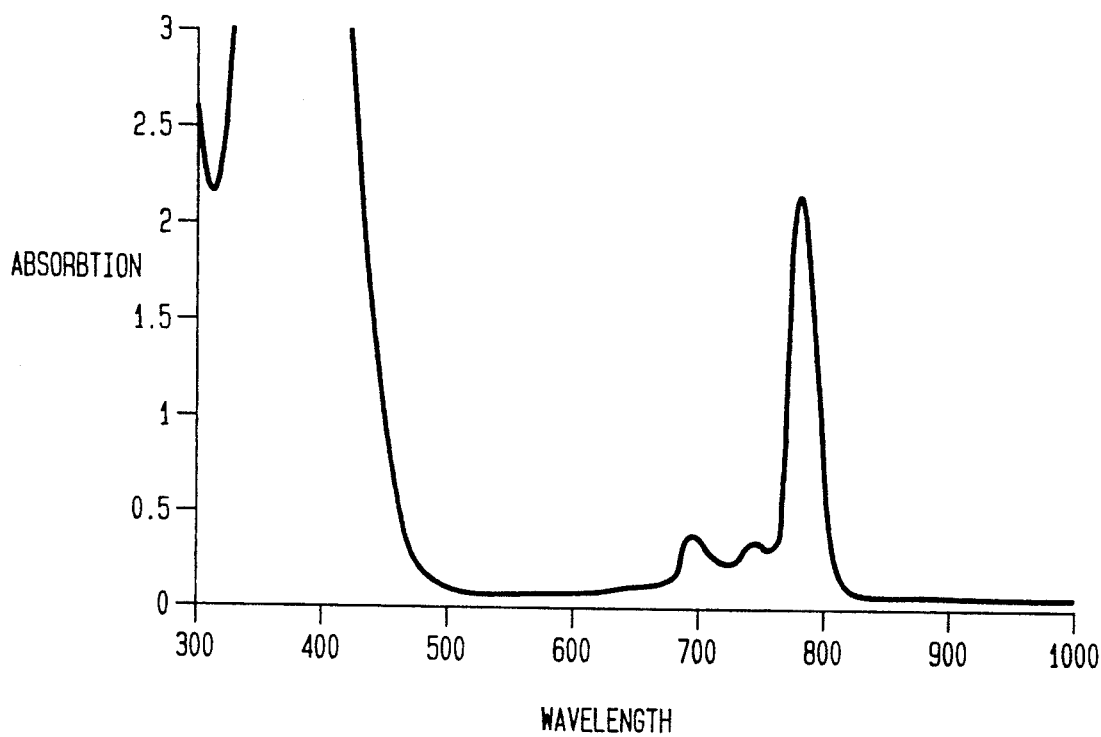
FIG. 3 shows the UV-Visible spectrum of a terpolymer useful in the present invention.

FIG. 3 shows the UV-Visible spectrum of a film prepared from the polymer of Formula 13. The spectrum shows the absorption characteristics of both the nonlinear optical moiety (with $\lambda_{max}$ around 370 nm) and the naphthalocyanine moiety (with $\lambda hd\ max$ around 780 nm), indicating the presence of both chromophores. When this film is used for frequency doubling, the oxynitrostilbene nonlinear optical moiety generates the

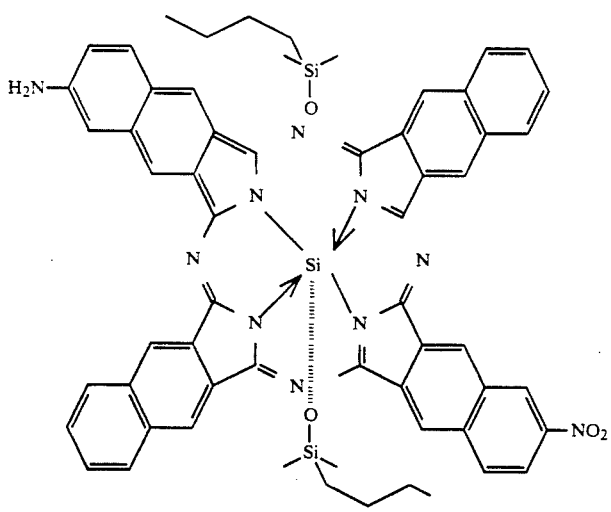

14

The present invention also relates to formation of solid film media using the organic layer materials of the invention. The organic materials of the invention have good solubility in common organic solvents such as halogenated hydrocarbons, ketones, esters, and the like, and can be cast as films, using methods known to those skilled in the art, such as spin coating, dip coating, brush second harmonic. The second harmonic falls into the anomalous dispersion regime of the naphthalocyanine moiety, and the dispersion of the refractive index is lowered, compared to when the polymer has only the nonlinear optical moiety but lacks the naphthalocyanine moiety. The relative contents of the monomers in the polymer may be varied suitably to achieve zero dispersion of the index, thus indicating the excellent control over the dispersion of index as well as phase matching achievable with the compositions of the invention.

Second order nonlinear response may be effected in the media by molecularly orienting the nonlinear optical units into a noncentrosymmetric configuration by poling with an external electric field. The process of poling a nonlinear optical medium is described by C. C. Teng et al, *Applied Physics Letters*, Vol. 56, 1734 (1990). The term "electric field" as employed herein refers to a high voltage electric field which is applied to the substrate of mobile molecules to induce bipolar alignment of the molecules parallel to the field.

In another embodiment this invention also provides devices for frequency doubling of a laser beam with phase matching. Such devices fabricated from the materials of this invention have various applications such as, for example, frequency doublers, optical switches, light modulators, and the like. In illustrative devices, the input laser beam power is between about 0.1-1 watt and the output laser beam power is at least about 1 milliwatt, and the input fundamental laser beam operates in the 700-1300 nm range. The second harmonic then emanates in the 350-650 nm range.

The input laser beam typically is in a transverse magnetic (TM) polarization mode, and the propagating mode of the input wave energy is zero-ordered.

A present inventive optical frequency converting device can be designed with the following material specifications:

| | |
|---|---|
| Nonlinear optical susceptibility $\chi^{(2)}$ | $1 \times 10^{-8}$ esu |
| Refractive index | 1.58 |
| Absorption cut-off frequency | 450 nm |

A present inventive optical frequency conversion system is characterized by efficient frequency doubling of input laser wave energy, confinement of the propagating wave energy for provision of a high power density, and matching between the fundamental and harmonic frequencies.

In practice an inventive frequency converting device can be utilized in combination with a transverse magnetic (TM) polarized laser radiation source which provides a 700-1300 nm input laser beam, a pair of prism coupling means which couple the laser beam to the waveguiding layer, and a utilization apparatus such as an optical disk data recording unit.

The coupling means can consist of a pair of prism couplers, such as Schott SF$_6$ optical glass with a high index of refraction. Optical coupling and decoupling also can be accomplished with optical diffraction gratings which are formed directly on the surface of the thin film waveguide, as described in U.S. Pat. Nos. 3,674,335; 3,874,782; and 3,990,775. Another coupling means is through the cleaved end faces of a waveguiding structure.

FIG. 1 is a graphic representation of the two cases of dispersion in waveguides. FIG. 1(a) has positive dispersion guide and negative dispersion cladding layer; FIG. 1(b) is the opposite case. FIG. 1 was described earlier.

FIG. 2 is a plot of the generalized dispersion parameter, $$D = \frac{\Delta N - \Delta n_2}{(n_1 - n_2)^\omega} \text{ versus } V^\omega,$$

for various values of the ratio, $V^{2\omega}/V^\omega$.

The phase matched waveguides of the present invention are relatively insensitive to any nonuniformity in waveguide thickness, or fluctuations in ambient temperature or source wavelength. Such waveguides are generally considered noncritically phase matched. Such insensitivity is demonstrated by FIG. 1(b) and FIG. 2. Thus, for example, the change of $\Delta N$ with respect to thickness t is given by $$\frac{d\Delta N}{dt} = (n_2^\omega - n_1^\omega) \frac{V^\omega}{t} \frac{dD}{dV^\omega}$$

and so thickness insensitive phase matching will be obtained when $dD/dV^\omega$ equals zero. For the phase matching condition depicted in FIG. 1(b), FIG. 2 shows that there are available values for $V^\omega$ as well as for the ratio $V^{2\omega}/V^\omega$ when $dD/dV^\omega$ equals zero.

In the case of temperature, when $$\frac{1}{\frac{1}{\rho} \cdot \frac{d\rho}{dT}} \frac{dD}{dT} \approx \frac{-\Delta N}{(n_2^\omega - n_1^\omega)}$$

where $$\frac{1}{\rho} \cdot \frac{d\rho}{dT}$$

is the compressibility of the polymer, then $d\Delta N/dT$ equals zero. Since the left hand side of the above equation is typically $<0.1$ and $n_2^\omega - n_1^\omega$ is about 0.1-0.01, then $\Delta N$ should be less than 0.01-0.001. That means that the inventive waveguides will be temperature insensitive.

In the case of wavelength, when $$\lambda \frac{dD}{d\lambda} \approx \frac{\Delta N}{(n_2^\omega - n_1^\omega)}$$

where $\lambda$ is the wavelength, then $d(\Delta N/\lambda)/d\lambda$ equals zero. Since the left hand side of the above equation is typically $<1.0$, and $n_2^\omega - n_1^\omega$ is about 0.1-0.01, then $\Delta N$ should be less than 0.1-0.01. That means that the inventive waveguides will be insensitive to wavelength fluctuations.

The following Examples are provided in order to further illustrate the present invention. The Examples are in no way meant to be limiting, but merely illustrative. The frequency doubling waveguiding device components are presented as being typical, and various modifications in design and operation can be derived in view of the foregoing disclosure within the scope of the invention.

EXAMPLES

Example 1

Synthesis of bis(tri-n-hexylsiloxy)silicon phthalocyanine (Formula 10)

A mixture of tri-n-hexylsilanol (14.9 g), sodium methoxide (2.67 g) and absolute ethanol (50 ml) was reduced to an oil under vacuum. This oil was added to a mixture of dichlorosilicon phthalocyanine (Formula 9, from Aldrich Chemical CO., Milwaukee, Wis., 15.10 g) and distilled, dry 1,2,4-trimethyl-benzene (70 ml). The resulting suspension was refluxed for 1 hr and was filtered hot using Whatman #54 filter paper. The filtrate was allowed to cool (12 hr) and was diluted with methanol (350 mol). The precipitated product of Formula 10 was isolated by filtration, washed with methanol (100 ml) and vacuum dried at room temperature overnight, (22.06 g, 79% yield) m.pt. 175° C.; IR (Nujol) 1525 (s), 1325 (s), 1125(s), 1080 (s), 1038 (s, Si—O—Si), 725 (s) $cm^{-1}$.

Example 2

Synthesis of hydroxy(tri-n-hexylsiloxy) silicon phthalocyanine (Formula 11)

This procedure is a modification of a procedure described by Batzel, Ph.D. Thesis, *Case western University*, Cleveland, Ohio, 1990. A mixture containing the compound of Formula 10 from Example 1 (15.05 g), trichloroacetic acid (6.27 g) and distilled dry toluene (120 ml) was refluxed for 1 hr. The resulting solution was concentrated under vacuum and was then added to a mixture of 5:1 pyridine/water (v/v, 60 ml) and was stirred for 2 hr at 62° C. The suspension formed was concentrated under vacuum and diluted with methanol (100 ml). The product to Formula 11 was isolated by filtration, washed with methanol (100 ml) and dried under vacuum at room temperature overnight,- (9.45 g, 84% yield): IR (Nujol) 3500 (w, OH), 1340 (s), 1125 (s), 1037 (m, Si—O—Si), 740 (s) $cm^{-1}$.

Example 3

Synthesis of (3-methacryloxypropyldimethylsiloxy) (tri-n-hexylsiloxy) silicon phthalocyanine (Formula 7)

A mixture containing the compound of Formula 11 from Example 2 (4.43 g), distilled dry toluene (100 ml), tri-n-butylamine (2.88 g), and 3-methacryloxyprpydimethylchlorosilane (3.43 g) was stirred at room temperature for 48 hr. The solution was concentrated under vacuum and was diluted with methanol (400 ml). The solid was isolated by filtration and dried under vacuum at room temperature overnight, (4.30 g, 80% yield), m. pt. 120° C.; IR (Nujol) 1714 (s, C=O), 1336 (s), 1250 (m, SiCH3), 1158 (s), 1123 (s), 1081 (s), 1044 (s, Si—O—Si), 736 (s) $cm^{-1}$; $^1H$ NMR: δ (ppm) 9.66 (m, Pc-H), 8.34 (m, Pc-H), 5.75 (s, C=CH2), 5.41 (s, C=CH2), 2.74 (t, g-CH2, C3 chain), 1.74 (s, CH3), 0.79 (m, e-CH2), 0.67 (t, CH3), 0.36 (m, d-CH2), −0.02 (m, g-CH2, C6 Chain), −0.99 (m, b-CH2, C3 chain), −1.27 (m, b-CH2, C6 Chain), −2.27 (m, a-CH2, C3 chain), −2.43 (m, a-CH2, C6 Chain), −2.84 (s, SiCH3).

Example 4

Synthesis of the Polymer of Formula 5

A mixture of recrystallized the silicon phthalocyanine monoacrylate monomer (Formula 7, 0.65 g), methylmethacrylate (Formula 6, 2.44 g), the oxynitrostilbene monomer (Formula 8, 10.00 g) and dry distilled chlorobenzene (120 ml) was purged with argon for two hours while being heated to about 60° C. AIBN (0.24 g) was added and the reaction was heated for 72 hr under argon atmosphere. Precipitation of the product was done in methanol and the solid was isolated by filtration and dried in a vacuum oven at 50° C. overnight, (12.59 g); Tg 60° C.; Mw 166,000; Mw/Mn 1.5.

Example 5

Synthesis of bis(3-methacryloxypropyldimethylsiloxy)silicon naphthalocyanine (Formula 12)

A mixture of dihydroxysilicon naphthalocyanine (2.10 g), 3-methacryloxypropyldimethylchlorosilane (3.09 g), and freshly distilled pyridine (75 ml) was stirred at about 50° C. for about 48 hours. The chlorosilane had been freshly distilled in vacuum before use. The mixture was filtered, and the filtrate was diluted with 1:1 v/v water:ethanol (100 ml). Compound of Formula 12 which precipitated was filtered, washed with methanol (2×50 ml), and dried in vacuum ambient temperature for about 12 hours. Yield: 2.96 g (86%). It was then recrystallized from toluene. M.pt. 170°-172° C.

Example 6

Synthesis of the terpolymer of Formula 13

A mixture of compound of Formula 12 (0.65 g), methyl methacrylate (2.44 g), monomer of Formula 8 (10.0 g) and dry distilled chlorobenzene (30 ml) was purged with argon for about 2 hours whole being heated to about 60° C. AIBN (0.24 g) was added and the polymerization was carried out by heating at that temperature for about 96 hours under argon. Precipitation of the terpolymer was done in methanol, and the solid was isolated by filtration, and dried in vacuum at about 50° C. for about 12 hours. Hield (11.83 g); $T_g$ 68° C.; $M_w$ 575,000; $M_w/M_n$ 21.

Example 7

Fabrication of a Frequency Doubling Waveguide where the Guide has Positive Dispersion and the cladding has Negative Dispersion This Example illustrates the construction and operation of an optical frequency converting waveguide, as depicted in FIG. 1(a).

A commercially available silicon dioxide coated silicon wafer is placed in an Edward's electron beam vacuum deposition system (Model No.: E-306A, from Edward's Temescal, Division of BOC Group, Inc., Berkeley, Calif.) and a 100 Å aluminum layer is deposited. Then a 15% by weight solution of polymethyl methacrylate in cyclohexanone containing 10% w/w bis(tri-n-hexylsiloxy)silicon naphthalocyanine/polymethyl methacrylate is spun at 1200 rpm to form a 2 μm thick film as lower cladding layer, and the film is dried in an oven at 100° C. for 6 hours. The cladding has anomalous dispersion n(1.3 μm)=1.50 and n(0.65 μm)=1.436.

A 15% by weight solution of a copolymer (50/50) of methyl methacrylate/4-(6-methacryloyloxy-hexyloxy)-4'-nitrostilbene ($T_g$, 90° C., prepared following the procedure descried in U.S. Pat. No. 4,822,865) in cyclohexanone is spun at 9000 rpm to form a 0.3 μm film as the waveguide medium. The film is dried in an oven for 3 hours at 120° C. The waveguide medium has positive dispersion n(1.30 μm)=1.576 and n(0.65 μm)=1.606. Then an upper cladding layer of the same solution as the lower cladding layer is spun at 1200 rpm to provide a 2 μm thin film in contact with the waveguide medium, and the film is dried in an oven at 100° C. for 6 hours.

A 100 Å aluminum layer is deposited as a top electrode on the upper cladding layer.

Wires are bonded to the two electrodes, and the laminated thin film waveguide structure is placed in a Mettler hot stage (Model No.: FP 82HT, from Mettler Instruments Corp., Hightstown, N.J.) and heated to 90° C. A voltage is applied across the waveguide to provide a field of 100 V/μm, and the polymeric waveguiding medium is poled for 5 minutes. The waveguide structure then is cooled to room temperature while maintaining the electric field.

The waveguide device is placed on a stage, and a 1.3 82 m light from a laser system (10 ns, 0.1 mJ) is coupled with lenses into the waveguide. A photomultiplier tube with narrow band interference filter (0.65 μm) is utilized in the detection system. The laser wavelength is scanned near 1.3 μm, and a high second harmonic intensity is observed, indicating that the poled waveguiding medium has achieved anomalous dispersion phase matching of fundamental and second harmonic waves.

The phase matching can be fine-tuned by variation of the laser wavelength or the waveguiding medium temperature or both.

As mentioned earlier, this waveguide construction was also insensitive to thickness fluctuations in the waveguide.

Example 8

Fabrication of a Waveguide with Anomalous Dispersive Guide and Positive Dispersive Cladding, as depicted in FIG. 1(b)

A commercially available $SiO_2$-coated silicon wafer was placed in the Edward's e-beam vacuum deposition system and an aluminum layer of thickness about 100 Angstroms was deposited.

Then a 15% wt % solution in cyclohexanone of a 50/50 copolymer of methyl methacrylate (Formula 6) and 4-(6-methacryloyloxy-hexyloxy)-4'-nitrostilbene (Formula 8) was spun on top at about 1200 rpm to give about 2 μm thick polymer film as lower cladding layer. The film was dried at about 120° C. for about 3 hours. The cladding has positive dispersion n(1.3 μm)=1.5767, n(0.65 μm)=1.606.

Then a 15 wt % solution in cyclohexanone of a 10 wt % blend of the naphthalocyanine of Formula 10 in the 50/50 copolymer of compound of Formulas 6 and 8 (see above) was spun at about 1000 rpm to form a film of about 2.4 μm thickness as the guiding layer, and the films are dried at about 120° C. for about 3 hours. The guide has anomalous dispersion n(1.3)=1.6294 and n(0.65)=1.621.

Then an upper cladding layer of the same material and thickness as the lower cladding was spun by a similar process and dried similarly. The fabrication of the waveguide was completed as in Example 7 above. The waveguide exhibited phase matched second harmonic generation near 1.3 μm fundamental radiation.

Example 9

Refractive Index Measurements and Zero Dispersion

Figure 4:
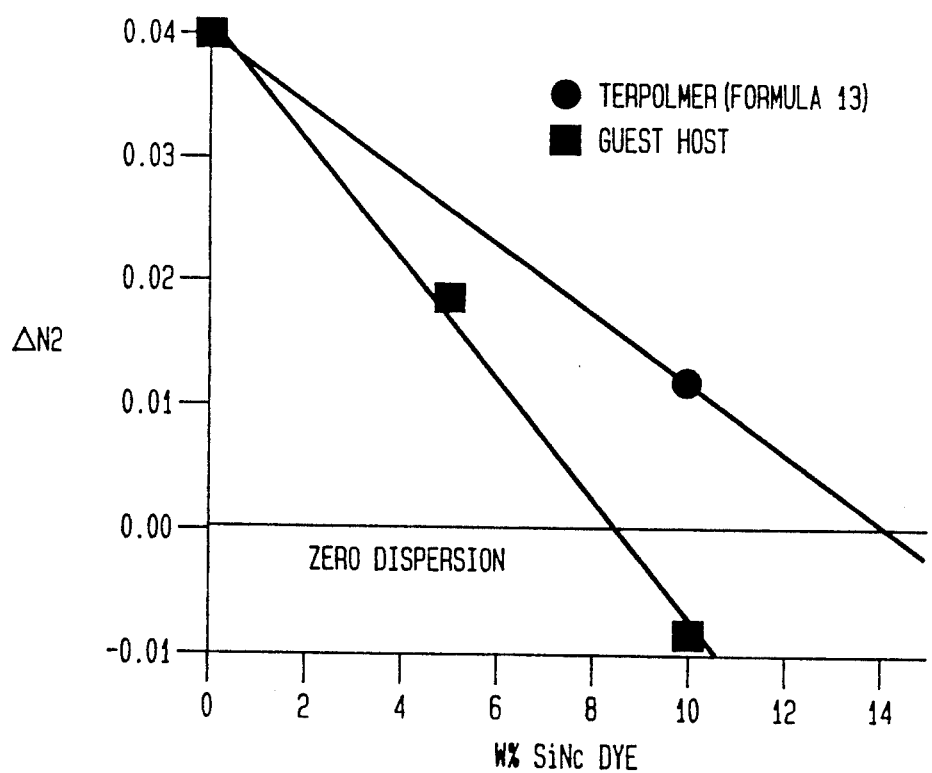
FIG. 4 shows the results of refractive index measurements on and zero dispersion achieved with the waveguides of the invention.

Two 15 wt % solutions in cyclohexanone of a 50/50 copolymer of compounds of Formulas 6 and 8 were blended, as a guest-host, with the naphthalocyanine of Formula 10 such that the resultant solutions would have concentrations of 5 and 10 wt %. These solutions were spuncoated on silicon wafers, and were dried at about 160° C. Refractive index measurements were performed with a prism coupler (Model 2010 from Metricon Corporation, Pennington, N.J.) at 1.3 μm and at 0.633 μm. FIG. 4 shows the difference in the refractive indices. FiG. 4 shows that at about 8.5 wt % concentration of the naphthalocyanine of Formula 10, zero dispersion is obtained. Also, depending on the concentration of the naphthalocyanine, one can vary the dispersion from positive to negative.

Instead of using a blend, the same experiment could be done using the terpolymer of Formula 13, which was dissolved in cyclohexanone to 15 wt % concentration. FIG. 4 shows the refractive index behavior of the films. At about 14 wt % concentration of the terpolymer, zero dispersion was obtained.

What is claimed is;

1. A waveguide device for frequency doubling of a laser beam which comprises a laminated thin film composite of (1) a waveguiding layer which exhibits second order nonlinear optical response, and (2) one or more cladding layers which have a lower refractive index than the waveguiding layer; wherein the waveguiding layer and the cladding layer have a combination of positive and negative dispersion of refractive index such that under wave propagating conditions the refractive index of said waveguiding layer at a fundamental light frequency is substantially equal to the refractive index of said waveguiding layer at a second harmonic light frequency, and the fundamental and second harmonic wave modes are phase matched.

2. A waveguide device in accordance with claim 1 wherein said waveguiding layer has a positive dispersion and said cladding layer has negative dispersion of refractive index.

3. A waveguide device in accordance with claim 1 wherein said waveguiding layer has a negative dispersion and said cladding layer has positive dispersion of refractive index.

4. A waveguide device in accordance with claim 1 wherein said device is insensitive to thickness variations in the waveguide.

5. A waveguide device in accordance with claim 1 wherein said device is insensitive to temperature variations in the waveguide.

6. A waveguide device in accordance with claim 1 wherein said device is insensitive to wavelength variations in the source radiation of the waveguide.

7. A waveguide device in accordance with claim 1 wherein said waveguiding layer is organic.

8. A waveguide device in accordance with claim 7 wherein said organic layer comprises a layer of a nonlinear optical polymer with an external field-induced noncentrosymmetric molecular orientation of pendant side chains, said polymer being characterized by a recurring monomeric unit corresponding to the formula:

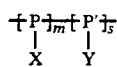

wherein P and P' could be the same or different and represent the monomer moieties forming the polymer backbone, m and s are integers which total at least 10, with the m monomer comprising between about 10-100 mole percent of the total (m+s) monomer units; X is a nonlinear optical moiety capable of frequency doubling of light, and Y is a moiety capable of anomalous dispersion of the refractive index at substantially the region of said frequency doubling, wherein the fundamental and harmonic frequencies are phase method.

9. The nonlinear optical polymer as described in claim 8, where P and P' represent vinyl monomer moieties.

10. The nonlinear optical polymer as described in claim 9, wherein said vinyl monomer moieties are acrylates.

11. The nonlinear optical polymer as described in claim 8, wherein said nonlinear optical moiety X is of the formula:

$$\begin{array}{c} S \\ | \\ M \end{array}$$

where S represents a spacer group, and M represents a conjugated moiety containing an electron-donor and an electron-acceptor group.

12. The nonlinear optical polymer a described in claim 11, wherein S is selected from the group consisting of $(CHR)_n$ and $(SiR^1{}_2)_p$ functionalities, where R is hydrogen or a C1-C6 alkyl, $R^1$ is a C1-C6 alkyl, n is an integer from 1-12, p is an integer from 1-6.

13. The nonlinear optical polymer as described in claim 12, wherein R is hydrogen, n is 6, $R^1$ is methyl, and p is 1.

14. The nonlinear optical polymer as described in claim 11, wherein said electron-donor group is

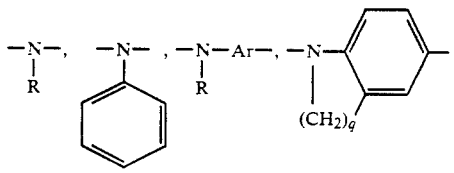

—O—, or —S—, R being hydrogen or a C1-C4 alkyl, q is 2-3, and Ar is

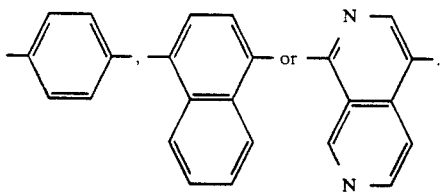

15. The nonlinear optical polymer as described in claim 11, wherein said electron-acceptor group is C(CN)2, C(H) (CN), C(H) (NO2), C(H) (CF3), C(H) (SO2CH3), or C(H) (SO2CF3).

16. The nonlinear optical polymer as described in claim 8, wherein Y comprises a moiety selected from the group consisting of a naphthalocyanine, phthalocyanine, anthracyanine, and porphyrin.

17. The nonlinear optical polymer as described in claim 16, wherein Y comprises a phthalocyanine.

18. The nonlinear optical polymer as described in claim 16, wherein Y comprises a napthahlocyanine.

19. A waveguide device in accordance with claim 1 wherein said waveguiding layer has a two-dimensional channel structure for intensified single mode wave transmission.

20. A waveguide device in accordance with claim 1 which is adapted for frequency doubling of a 700-1300 nm laser beam.

21. A waveguide device in accordance with claim 1 wherein the waveguiding layer is in combination with a pair of electrodes for the application of an electric field to the waveguiding layer.

22. A waveguide device in accordance with claim 1 wherein under phase matching conditions the fundamental and harmonic waves are in zero order propagating modes of the same polarization and utilize the $d_{33}$ coefficient.

23. A process for providing a short wavelength laser source which comprises (1) introducing a 700-1300 nm laser beam into an optical waveguide device comprising a substrate-supported laminated thin film composite of (a) an organic waveguiding layer which exhibits second order nonlinear optical response, and (b) organic cladding layers which have a lower refractive index than the waveguiding layer; wherein the generalized optical dispersion of the waveguide:

$$D = \frac{\Delta N - \Delta n_2}{n_2{}^\omega - n_1{}^\omega}$$

is a function of normalized frequency parameter $V^\omega$ for different ratios of $V^{2\omega}/V^\omega$, and $\Delta N = N^{2\omega} - N^\omega$ is the optical dispersion of the effective refractive indices of the zero order fundamental and harmonic wave modes, $\Delta n_2 = n_2{}^{2\omega} - n_2{}^\omega$ is the optical dispersion of the waveguiding layer, $n_2{}^\omega - n_1{}^\omega$ is the refractive index difference between the waveguiding layer and a cladding layer at the fundamental wave frequency, and $$V^\omega = \frac{2\pi t}{\lambda} \sqrt{(n_2{}^\omega)^2 - (n_1{}^\omega)^2}$$

$$V^{2\omega} = \frac{4\pi t}{\lambda} \sqrt{(n_2^{2\omega})^2 - (n_1^{2\omega})^2}$$

where $V^\omega$ and $V^{2\omega}$ are the generalized fundamental and second harmonic wave frequency parameters, t is the thickness of the waveguiding layer, and $\lambda$ is the wavelength; and wherein $\Delta N$ approximates zero under phase matching conditions; and (2) doubling the frequency of the propagating fundamental wave to provide an output 350-650 nm laser beam; and, wherein the waveguiding layer comprises a polymer with an external field-induced noncentrosymmetric molecular orientation of pendant side chains, and the polymer is characterized by a recurring monomeric unit corresponding to the formula:

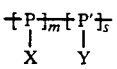

wherein P and P' could be the same or different and represent the monomer moieties forming the polymer backbone, m and s are integers which total at least 10, with the m monomer comprising between about 10-100 mole percent of the total (m+s) monomer units; X is a nonlinear optical moiety capable of frequency doubling of light, and Y is a moiety capable of anomalous dispersion of the refractive index at region of said frequency doubling, wherein the fundamental and harmonic frequencies are phase matched.

24. A process in accordance with claim 23 wherein Y represents a phthalocyanine or a naphthalocyanine moiety.

25. A waveguide device for frequency doubling of a laser beam which comprises a laminated thin film composite of (1) a waveguiding layer which exhibits second order nonlinear optical response, and (2) one or more cladding layers which have a lower refractive index than the waveguiding layer; wherein the waveguiding layer has a substantially zero dispersion of refractive index, and the cladding layer has a negative dispersion of refractive index, such that under wave propagating conditions the refractive index of said waveguiding layer at a fundamental light frequency is substantially equal to the refractive index of said waveguiding layer at a second harmonic light frequency, and the fundamental and second harmonic wave modes are phase matched.

26. A waveguide device as described in claim 25, wherein said waveguiding layer comprises a mixture of suitable components, the dispersive properties of said components complementing one another such that the net dispersion in said guiding layer is substantially zero.

27. A waveguide device as described in claim 26, wherein said suitable components are organic materials.

28. A nonlinear optical polymer of the formula:

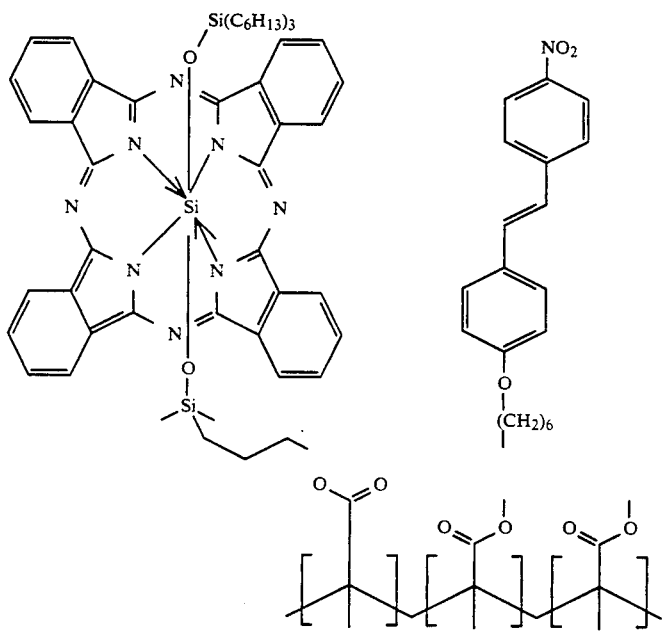

29. A nonlinear optical polymer of the formula:

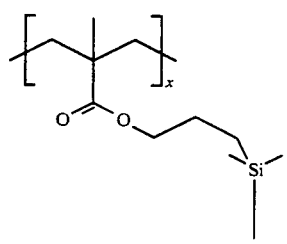

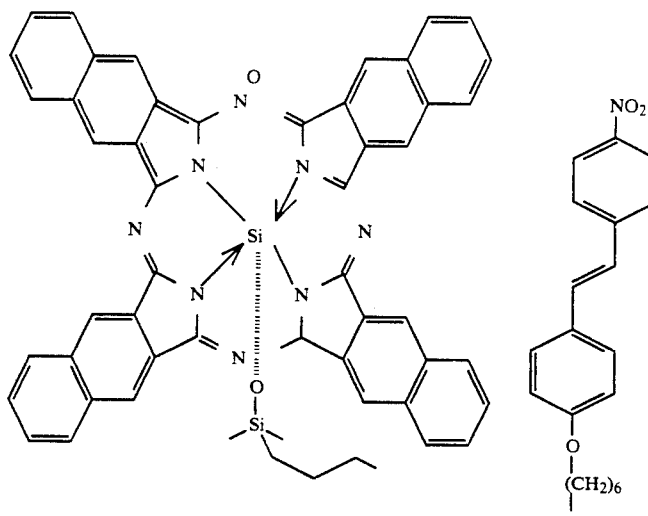
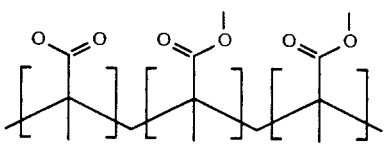

30. An amorphous nonlinear optical medium which comprises a guest-host mixture of a nonlinear optical polymer that is capable of frequency doubling of a laser source and a compound capable of anomalous dispersion of the refractive index at substantially the region of said frequency doubling, such that the fundamental and harmonic frequencies are phase matched.

31. An amorphous nonlinear optical medium which comprises a guest-host mixture of a polymer that contains covalently linked azaannulene parts, and a nonlinear optical material, said nonlinear optical material being capable of frequency doubling of a laser source and said polymer being capable of anomalous dispersion of the refractive index at substantially the region of said frequency doubling, wherein the fundamental and harmonic frequencies are phase matched during said frequency doubling.

32. A film forming nonlinear optical material of the formula:

X—Q—Y wherein Q is an azaannulene moiety, X is an electron donor containing group, Y is an electron withdrawer containing group, X and Y are covalently linked to Q and are capable of generating harmonic frequencies of light from fundamental frequencies, and Q is capable of causing anomalous dispersion of refractive index, such that the refractive index of said nonlinear optical material at said harmonic frequency is substantially the same as the refractive index at said fundamental frequency, and said harmonic and said fundamental frequencies are phase matched.

* * * * *